United States Patent [19]

Hopkins et al.

[11] Patent Number: 4,654,047
[45] Date of Patent: Mar. 31, 1987

[54] HYBRID MEMBRANE/CRYOGENIC PROCESS FOR HYDROGEN PURIFICATION

[75] Inventors: Jeffrey A. Hopkins, Whitehall; Stephen P. DiMartino, Topton; David M. Nicholas, New Tripoli, all of Pa.

[73] Assignee: Air Products and Chemicals, Inc., Allentown, Pa.

[21] Appl. No.: 769,204

[22] Filed: Aug. 23, 1985

[51] Int. Cl.$^4$ ............... F25J 3/08; B01D 53/22
[52] U.S. Cl. ........................................ 62/23; 62/24; 62/27; 55/16; 423/248
[58] Field of Search ............... 55/16; 62/23, 24, 27, 62/44, 28; 423/247, 248

[56] References Cited

U.S. PATENT DOCUMENTS

| | | | |
|---|---|---|---|
| 2,747,970 | 5/1956 | Rosenblatt | 423/247 |
| 3,246,450 | 4/1966 | Stern et al. | 55/16 |
| 3,250,080 | 5/1966 | Garwin | 62/24 |
| 3,324,626 | 6/1967 | Dresser et al. | 55/16 |
| 3,359,744 | 12/1967 | Bolez et al. | 62/36 |
| 3,455,817 | 7/1969 | Modell | 55/16 |
| 3,663,162 | 5/1972 | Randhava | 423/247 |
| 3,838,553 | 10/1974 | Doherty | 55/58 |
| 3,864,465 | 2/1975 | Hoffert | 423/648 |
| 3,975,170 | 8/1976 | Keating, Jr. | 55/16 |
| 4,242,875 | 1/1981 | Schaefer | 62/23 |
| 4,374,657 | 2/1983 | Schendel et al. | 62/19 |
| 4,548,618 | 10/1985 | Linde et al. | 55/16 |

FOREIGN PATENT DOCUMENTS 1017637 1/1966 United Kingdom ............... 55/16

Primary Examiner—Kenneth M. Schor
Assistant Examiner—Andrew J. Anderson
Attorney, Agent, or Firm—Mark L. Rodgers; E. Eugene Innis; James C. Simmons

[57] ABSTRACT

The present invention involves a process for recovering hydrogen from a feed gas mixture comprising hydrogen and at least one other component. The feed gas mixture is initially separated in a membrane separation unit to produce a hydrogen-rich stream and a hydrogen-lean stream. The hydrogen-lean stream is subsequently treated in a cryogenic separation unit to remove a portion of the non-hydrogen components and produce a hydrogen-enriched stream. The hydrogen-enriched stream from the cryogenic separation unit is recycled and combined with the feed gas mixture to the membrane separation unit.

13 Claims, 2 Drawing Figures

HYBRID MEMBRANE/CRYOGENIC PROCESS FOR HYDROGEN PURIFICATION

TECHNICAL FIELD OF THE INVENTION

The present invention involves a process for recovering a purified hydrogen stream from a feed gas mixture comprising hydrogen and at least one other component.

BACKGROUND OF THE INVENTION

A wide variety of processes and techniques have been developed to separate and recover hydrogen from a multi-component gas stream.

U.S. Pat. No. 3,359,744 discloses a method for removing hydrocarbons from a crude hydrogen stream wherein a portion of a purified hydrogen stream is mixed with condensed and separated hydrocarbons and the mixture is used to refrigerate and condense the incoming crude hydrogen to obtain increased purity of the product hydrogen. This system also utilizes either product hydrogen or separated hydrocarbons to regenerate and cool a plurality of switching adsorbers which remove water and other impurities prior to condensation of the crude hydrogen stream.

U.S. Pat. No. 3,864,465 discloses a method of purifying hydrogen off-gas to at least 90% $H_2$ by initially contacting the off-gas with a bed of fluidized iron oxides at temperatures between 160° C. and 310° C. and pressures between 100 psi and 1,000 psi. The $H_2$-containing gas from the fluidized iron oxide bed is then passed through a cryogenic separator to remove impurities, which are mostly methane, to produce a purified hydrogen stream.

U.S. Pat. No. 4,242,875 describes a process for the cryogenic purification of industrial by-product gas stream which contain hydrogen in recoverable amounts in which a second, separate feed stream is employed to enhance the refrigeration of the purification system and permit the recovery of an increased amount of hydrogen of the desired purity. Providing a second, separate feed stream allows by-product hydrogen streams to be used which contain non-readily condensable impurities with boiling points below that of methane, such as nitrogen or helium, which are detrimental to a hydrogen product utilized in hydrocracking or hydrotreating processes.

A membrane separation technique is described in U.S. Pat. No. 3,975,170. The method involves passing a fluid mixture whose hydrogen concentration is to be controlled through one chamber of a diffusion cell separated into two chambers by a hydrogen permeable membrane. A gradient of hydrogen partial pressure is then maintained across the membrane at a level sufficient to cause diffusion of hydrogen through the membrane to maintain the concentration of hydrogen in the fluid mixture at a predetermined level. The hydrogen concentration of the fluid may be controlled to some positive value by maintaining a second, fluid-containing hydrogen gas in the other chamber of the diffusion cell, or the hydrogen concentration of the fluid may be controlled to a value approximating zero hydrogen concentration by maintaining a near vacuum in the other chamber of the diffusion cell.

BRIEF SUMMARY OF THE INVENTION

The present invention is a process for recovering a purified hydrogen stream from a feed gas mixture containing hydrogen and at least one other component.

The process comprises passing the feed gas mixture to a membrane separation unit containing a semi-permeable membrane having different permeabilities for hydrogen and the other components in the feed gas. The membrane separation unit produces a hydrogen-rich stream and a hydrogen-lean stream. The hydrogen-lean stream from the membrane separation unit is passed to a cryogenic separation unit for treatment and separation to produce a hydrogen-deficient stream and a hydrogen-enriched stream. The hydrogen-enriched stream from the cryogenic separation unit is recycled and combined with the feed gas mixture entering the membrane separation unit. Both the hydrogen-deficient stream from the cryogenic separation unit and the hydrogen-rich stream from the membrane separation unit are recovered as products from the system.

In some instances the hydrogen-rich stream recovered as product may undergo post treatment for further purification and/or removal of undesirable components. For example, if the CO concentration exceeds the CO product specification, the hydrogen-rich stream may be fed to a methanation reactor which reacts most of the remaining CO with some of the hydrogen to form methane and water. Chillers may also be used to remove the water if the hydrogen product dew point specification dictates.

DETAILED DESCRIPTION OF THE INVENTION

The present invention provides an efficient process for recovering a hydrogen-rich product from a gas mixture containing hydrogen and at least one other component. The process can be used to treat feed gas mixtures of varying hydrogen concentrations, but is especially applicable to gas mixtures where the hydrogen concentration is above 70% and where the major impurities are hydrocarbons.

Figure 1:
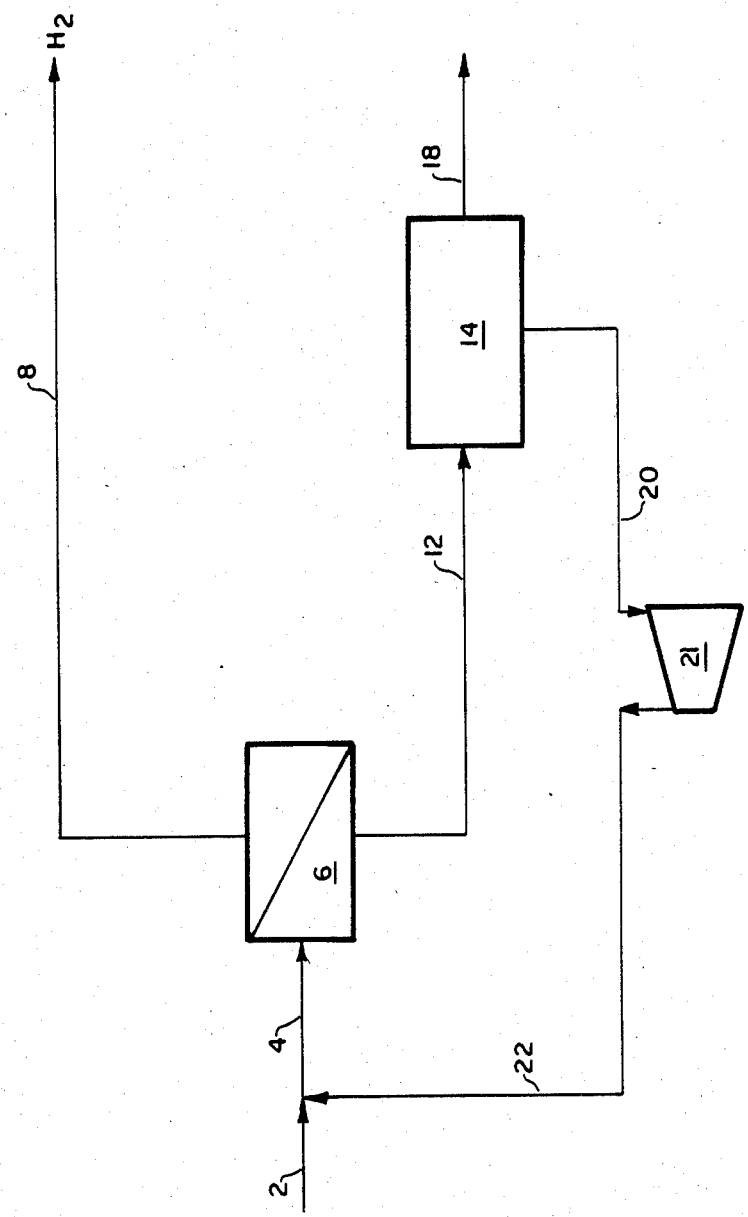
FIG. 1 is a schematic diagram of a process in accordance with the present invention.

As shown in FIG. 1, a feed gas mixture 2 is mixed with a recycle stream 22 from a cryogenic separation unit 14 to form a combined feed stream 4. Any feed gas mixture can be used which contains hydrogen and at least one other component which has a different permeability across a semi-permeable membrane. Examples of such feed gas mixtures include: purge gas in ammonia or methanol synthesis, the off-gas from a hydrocracking operation, etc.

If not already pressurized, the feed gas mixture 2 is pressurized to at least 200 psia, and preferably to between 500–2,100 psia. The combined feed stream 4 is fed to a membrane separation unit 6 for partial $H_2$ separation. The membrane separation unit 6 contains one or more membranes which have different permeabilities for $H_2$ and the other components in the feed gas. Examples of membranes used in this type of process include spiral-wound cellulose-acetate type, polysulfone hollow fiber type and polyimide membranes. The feed gas is separated in the membrane separation unit 6 to produce a hydrogen-rich permeate stream 8; e.g., typically greater than 90% $H_2$, and a hydrogen-lean reject stream 12; e.g., typically less than 60% $H_2$.

In some instances, it may be necessary to use two or more cascaded membranes to achieve desired hydrogen product purity. In this type of system, the hydrogen-rich permeate stream from the first membrane separator is recompressed and fed to a second membrane unit. The permeate from the second unit is recompressed and recovered as product, or if needed, passed to a third unit. The reject from the second, or any subsequent, membranes is recycled to the feed of the previous membrane to minimize hydrogen loss. Alternatively, the membrane unit may produce a reject stream rich in hydrogen and a permeate stream lean in hydrogen. In such cases the hydrogen-lean permeate stream would be further processed, and the hydrogen-rich reject stream would be recovered as product.

The hydrogen-rich permeate stream 8 from the membrane separation unit 6 is recovered as a hydrogen product. Depending upon the desired end use, the hydrogen-rich stream 8 may be passed to a compressor to attain the desired end product pressure. For feed gas streams which contain carbon monoxide, the present cycle may not remove sufficient CO from the hydrogen product. For example, a typical specification is less than 10 ppmv of CO in hydrogen which may not be met with certain membrane systems. To remove excess CO, the permeate stream may be compressed and sent to an appropriate post treatment apparatus, such as a methanation reactor (not shown) which reacts most of the remaining CO with some of the hydrogen to form methane and water. Additionally, chillers may also be installed to remove water if the hydrogen product dew point specification dictates.

The hydrogen-lean reject stream 12 from the membrane separation unit 6 is passed to a cryogenic separation unit 14 where it is treated and separated to produce a hydrogen-enriched stream 20 and a hydrogen-deficient stream 18. In the case where the feed gas mixture comprises hydrogen and hydrocarbons, the hydrogen-deficient stream 18 is a low pressure, medium Btu fuel stream which is subsequently compressed and recovered as usable product. In the case of other gas mixtures, the hydrogen-deficient stream 18 may be recovered or simply discarded. The hydrogen-enriched stream 20 from the cryogenic separation unit 14 typically comprises about 80–95% hydrogen, and is typically at a lower pressure than the original feed gas mixture. The hydrogen-enriched stream 20 is compressed in compressor 21 to a pressure about equal to that of the feed gas mixture 2, and is subsequently recycled and combined with said feed gas 2, to form combined stream 4, prior to being passed to the membrane separation unit 6.

The membrane unit 6 serves as a hydrogen rejection unit which brings the cryogenic separation unit feed to a composition where auto-refrigeration is possible. By generating a hydrogen-enriched stream 20 and recycling it back to the membrane feed 2, the refrigeration demand and size of the cryogenic unit 14 are smaller since it is generating an upgraded hydrogen stream, and not a high purity product. Recycling the hydrogen-enriched stream 20 allows a single high-purity hydrogen stream to be recovered instead of a high purity and a separate low purity stream. Additionally, since the refrigeration demand of the cryogenic unit is reduced, the fuel pressure can be raised and fuel recycle to the unit can be eliminated. The membrane separation unit 6 can also be more efficient than other cycles because it receives a feed with a higher hydrogen concentration than it would if the hydrogen-enriched recycle from the cryogenic unit were not present. This in turn reduces the power requirements, since less severe purification is needed by the individual units. Although this may lead to lower hydrogen recoveries in each of the individual units, these lower recoveries are not detrimental, as the combined cycle minimizes hydrogen loss.

To prevent any $H_2O$ and $CO_2$ present in the feed from freezing, these components should be removed before entering the cryogenic separation unit 14. Typically this is done by passing the feed stream through a drier (not shown) having a molecular sieve bed. If the feed gas mixture contains a high concentration of compounds that will poison the membrane, the drier is located before the membrane separation unit. Conversely, if the concentration of such compounds is low, the drier is placed between the membrane separation unit and the cryogenic separation unit 14. In some instances, a slip stream from the cryogenic separation unit 14 can be used to regenerate the spent molecular sieve beds in the drier.

Combining a membrane unit with a cryogenic unit into a single process cycle allows for the recycle of the cryogenic unit reject stream to the feed of the membrane unit, thereby reducing hydrogen loss from the cycle. The combined cycle also allows each purifier to operate with a lower recovery, and consequently operate at less severe operating conditions. This reduces the size and cost of the two purifiers relative to stand-alone operations.

A wide range of process conditions including temperatures, pressures, flow rates, etc. can be employed in the present process to achieve optimum results. For example, optional compressors or expanders may be utilized to vary the pressure of any of the gas streams depending upon the gas mixture, treatment pressures, and pressure difference between any two streams which are subsequently combined. Additionally, vacuum pumps may be used to achieve sub-atmospheric pressure on the permeate side of one or more of the membranes in order to increase diffusion rates of the desired gas across the membrane.

While the present invention is especially adaptable for separating hydrogen from other components in a hydrogen-containing gas stream, it can be used for any gas stream which contains at least two components which have different permeabilities through a given membrane. Examples of such applications include separating helium from methane and/or nitrogen; nitrogen from air; oxygen from air; argon from ammonia purge gas; nitrogen from a nitrogen-methane mixture, etc.

The example below illustrates one such process scheme and is meant only to be illustrative and is not meant to limit the scope of the invention.

EXAMPLE 1

Figure 2:
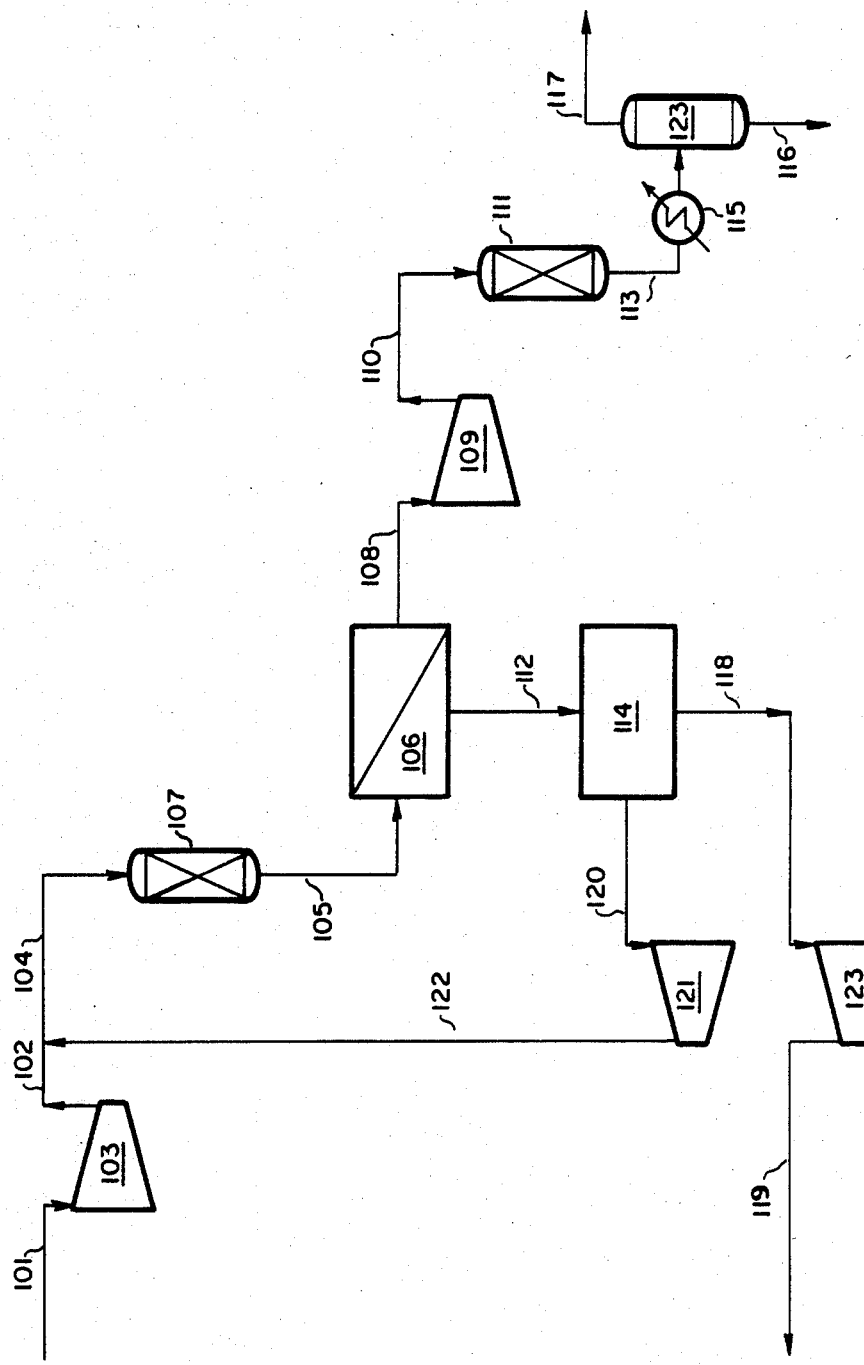
FIG. 2 is a flow diagram of one embodiment of the present invention.

The process of the present invention was carried out to produce a 97% hydrogen product stream from an ethylene off gas containing about 72% hydrogen. The process was designed to recover at least 98% of the hydrogen present in the feed gas mixture. The specification required that the final hydrogen product contain less than 30 ppmv CO and have a dew point no higher than 40° F. This process is shown in detail in FIG. 2.

An ethylene off-gas 101 at a pressure of 74.7 psia is compressed to a pressure of about 520 psia in compressor 103 to form a compressed feed stream 102. The compressed feed stream 102 is combined with a hydrogen-enriched stream 122 from a cryogenic separation unit 114 to form a combined feed stream 104. The combined feed stream 104 is passed through an oil removal unit 107 to remove compressor lube oil from the feed stream to form stream 105, which is subsequently passed to a membrane separation unit 106. The membrane separation unit 106 separates the feed stream to form a hydrogen-rich permeate stream 108 having a hydrogen concentration of about 97% at a pressure of about 200 psia, and a hydrogen-lean reject stream 112 having a hydrogen concentration of about 46.4% at a pressure of 485 psia.

The hydrogen-rich permeate stream 108 is compressed to 755 psia in compressor 109 to form a hydrogen-rich compressed stream 110. This compressed stream 110 is then passed to a methanator 111 to remove carbon monoxide by reacting it with a portion of the hydrogen contained in the stream. Stream 113 leaves the methanator 111 containing little or no carbon monoxide, and having a dew point of about 57° F. due to water added by the methanator. Stream 113 is passed to a chiller 115 and separator 123 to reduce the dew point from 57° F. to below 40° F. by condensing and removing water as stream 116. The resultant stream 117, having a hydrogen concentration of about 97% at a pressure of about 700 psia is recovered as a hydrogen-rich product.

The hydrogen-lean reject stream 112 leaves the membrane separation unit 106 at a pressure of about 485 psia and is passed to a cryogenic separation unit 114 where it is cooled and separated to form a hydrogen-enriched stream 120 having a hydrogen concentration of about 91% at a pressure of 450 psia and a hydrogen deficient stream 118 containing about 3% hydrogen at a pressure of 30 psia. The hydrogen-enriched stream 120 is compressed to 520 psia in compressor 121 to form a compressed hydrogen-enriched stream 122 which is subsequently recycled and combined with compressed feed stream 102 prior to being passed to the membrane separation unit 106 after oil removal in unit 107. The hydrogen deficient stream 118 is rich in hydrocarbons and is compressed to 250 psia in compressor 123 to form a hydrocarbon-rich compressed stream 119 which is subsequently recovered as product.

A material balance showing the key process streams for this example are given in Table 1 below.

membrane separation unit with the cryogenic separation unit and recycling the hydrogen-enriched stream from the cryogenic separation unit to the membrane feed, a highly efficient process has been developed to produce both a hydrogen-rich product and a second product stream from the cryogenic separation unit.

Having thus described the present invention, what is now deemed appropriate for Letters Patent is set out in the following appended claims.

What is claimed is:

1. A process for recovering a purified hydrogen product from a feed gas mixture comprising hydrogen and at least one other component, said process comprising:
   a. passing said feed gas stream to a membrane separation unit to produce a hydrogen-rich stream and a hydrogen-lean stream;
   b. passing said hydrogen-lean stream to an auto-refrigerated cryogenic separation unit for treatment and separation to produce a hydrogen deficient stream and a hydrogen-enriched stream having a hydrogen concentration between 80–95 mole %;
   c. combining the hydrogen-enriched stream with the feed gas stream entering the membrane separation unit;
   d. recovering the hydrogen-deficient stream; and
   e. recovering the hydrogen-rich stream from the membrane separation unit as purified hydrogen product having a hydrogen concentration of at least 97 mole %.

2. The process in accordance with claim 1 wherein the hydrogen-rich stream produced by the membrane separation unit is the permeate stream and the hydrogen-lean stream is the reject stream.

3. The process in accordance with claim 2 wherein the feed gas stream is pressurized to at least 200 psi prior to being passed through the membrane separation unit.

4. The process in accordance with claim 3 wherein the pressure of the hydrogen-enriched stream from the cryogenic separation unit is adjusted to be about equal to the pressure of the feed gas stream entering the membrane separation unit prior to combining said streams.

5. The process in accordance with claim 4 wherein the feed gas mixture comprises hydrogen at a concentration of at least 70%.

6. The process in accordance with claim 5 wherein at least 98% of the hydrogen present in the feed is recovered as purified hydrogen product.

TABLE 1

| STREAM NO. | 101 | 105 | 108 | 110 | 112 | 117 | 118 | 119 | 120 | 122 |
|---|---|---|---|---|---|---|---|---|---|---|
| PRESSURE (psia) | 74.7 | 500.0 | 200.0 | 755.0 | 485.0 | 700.0 | 30.0 | 250.0 | 450.0 | 520.0 |
| FLOW RATE (Moles/Hr.) | | | | | | | | | | |
| Hydrogen | 2524.60 | 3315.37 | 2497.97 | 2497.97 | 817.40 | 2493.62 | 26.63 | 26.63 | 790.77 | 790.77 |
| Carbon Monoxide | 7.43 | 12.76 | 1.22 | 1.22 | 11.54 | — | 6.21 | 6.21 | 5.33 | 5.33 |
| Nitrogen | 2.44 | 5.38 | 0.30 | 0.30 | 5.08 | 0.30 | 2.14 | 2.14 | 2.94 | 2.94 |
| Methane | 906.24 | 977.52 | 75.00 | 75.00 | 902.52 | 76.22 | 831.24 | 831.24 | 71.28 | 71.28 |
| Ethane | 2.25 | 2.25 | 0.06 | 0.06 | 2.19 | 0.73 | 2.19 | 2.19 | — | — |
| Ethylene | 24.45 | 24.49 | 0.66 | 0.66 | 23.83 | — | 23.79 | 23.79 | 0.04 | 0.04 |
| Acetylene | 0.35 | 0.36 | 0.01 | 0.01 | 0.35 | — | 0.34 | 0.34 | 0.01 | 0.01 |
| Water | — | — | — | — | — | 0.49 | — | — | — | — |
| TOTAL | 3467.76 | 4338.13 | 2575.22 | 2575.22 | 1762.91 | 2571.36 | 892.54 | 892.54 | 870.37 | 870.37 |

From the material balance set out in the above table, it can be seen that the present process produces a hydrogen-rich product stream; i.e., having a hydrogen concentration of about 97%, and also produces a hydrocarbon-rich product, while removing impurities such as carbon monoxide. As stated above, by combining the 7. The process in accordance with claim 6 wherein the hydrogen-deficient stream recovered from the cryogenic separation unit comprises a medium Btu fuel.

8. The process in accordance with claim 7 wherein the membrane separation unit comprises a membrane having a higher permeability to $H_2$ than the other components in the feed gas mixture.

9. The process in accordance with claim 8 wherein the membrane separation unit contains a membrane selected from the group consisting of cellulose acetate type, polysulfone hollow filter type and polyimide type membranes.

10. The process in accordance with claim 9 wherein the feed gas mixture is passed through a drying unit to remove $H_2O$ and/or $CO_2$ prior to passing said feed gas through the membrane separation unit.

11. The process in accordance with claim 9 wherein the hydrogen-lean reject stream from the membrane separation unit is passed through a drying unit to remove $H_2O$ and/or $CO_2$ prior to passing said stream to the cryogenic separation unit.

12. The process in accordance with claim 9 wherein the hydrogen-rich stream from the membrane separation unit is treated in a methanation reactor prior to being recovered as hydrogen product.

13. The process in accordance with claim 12 wherein the hydrogen-rich stream treated in the methanation reactor is subsequently passed to a chiller and separator to remove water prior to being recovered as hydrogen product.

* * * * *